July 20, 1954

W. C. BAUMAN 2,684,331

SEPARATION OF SUBSTANCES HAVING
DIFFERENT DEGREES OF IONIZATION

Filed Jan. 11, 1952

INVENTOR
William C. Bauman

BY
Griswold & Burdick
ATTORNEYS

INVENTOR
William C. Bauman

BY Griswold & Burdick
ATTORNEYS

July 20, 1954

W. C. BAUMAN
SEPARATION OF SUBSTANCES HAVING
DIFFERENT DEGREES OF IONIZATION 2,684,331

Filed Jan. 11, 1952

INVENTOR
William C. Bauman

BY
Griswold & Burdick
ATTORNEYS

Patented July 20, 1954

2,684,331

UNITED STATES PATENT OFFICE 2,684,331

SEPARATION OF SUBSTANCES HAVING DIFFERENT DEGREES OF IONIZATION

William C. Bauman, Midland, Mich., assignor to The Dow Chemical Company, Midland, Mich., a corporation of Delaware Application January 11, 1952, Serial No. 266,027

10 Claims. (Cl. 210—24)

1

This invention concerns a method of separating, from one another, two or more substances having widely different ionization constants, at least one of which substances undergoes considerable ionization in a dilute aqueous solution thereof. The invention pertains more particularly to a method wherein an aqueous solution of a solute that is ionized to a considerable extent and another solute that is less extensively ionized, e. g. non-ionized, is treated with a solid material which selectively absorbs the less extensively ionized solute, leaving the more highly ionized solute in the surrounding liquid, and wherein such surrounding liquid is removed out of contact with the absorbent after which the absorbed solute is washed from the absorbent.

The invention is based on a discovery that when an ion exchange resin and an aqueous solution, containing an ionized solute and a less extensively ionized, or a non-ionized, solute which is capable of being absorbed by the resin, are contacted with one another, and the ion exchange resin possesses an ion common to (i. e. of the same kind as) one of the ions of the ionized solute, the less extensively ionized solute is selectively absorbed by the ion exchange resin, leaving a major portion of the ionized solute dissolved in the liquid surrounding the ion exchange resin. The surrounding liquid may be washed, flushed, or drained from the ion exchange resin, after which the absorbed, less extensively ionized solute may be washed, flushed, or extracted from the resin. The ionized solute and the less extensively ionized solute are thereby separated from one another.

The method, as just outlined, constitutes a new type of a chromatographic separation process and should not be confused with the chromatographic separations heretofore known. The conventional chromatographic separations, e. g. the removal of colored impurities from an aqueous sugar solution by treating the solution with animal charcoal, are each based on a specific discovery that one of two or more solutes in a particular solution is preferentially absorbed by a particular solid absorbent material. In most instances, the knowledge, or experience, as to prior chromatographic separations is not informative as to whether a new combination of solutes in an untested solution can be separated chromatographically, or as to what solid mate-

2 rial should be used as an absorbent if such separation is possible. In contrast, the method of this invention is limited by requirements that the solution under treatment contain an ionized solute and a less extensively ionized solute and that the selective absorbent be an ion exchange resin having an ion of the same kind as one of the ions of the ionized solute. Apparently because of a common ion effect, the more highly ionized solute is repulsed and prevented from being absorbed to any great extent by the ion exchange resin. In other words, the method of the invention appears to depend, for operability, upon a positive repellant action due to a common ion effect. Accordingly, it is possible to predict quite accurately the results obtainable with certain species of the invention from the results previously obtained with other species of the invention.

The method of the invention should not be confused with usual ion exchange processes wherein ions are absorbed by reaction with ion exchange materials and are thereby separated from other ions, or solutes, present in a solution treated with the ion exchange material. In such ion exchange processes, it is an ion, rather than a compound, which is removed by the ion exchange material, and the removal involves a chemical reaction and not a physical absorption of a non-ionic or a lowly ionized compound, as in the method of the invention. Also, an ion thus taken up by an ion exchange material in an ion exchange process can be displaced therefrom only by a chemical reaction with a regenerating agent. In contrast, the non-ionized, or lowly ionized, compound which is absorbed by an ion exchange resin in the process of the invention may physically be displaced from the resin merely by washing it with a liquid, e. g. water.

As hereinbefore indicated, there are certain factors which limit the scope of the invention. All ion exchange resins, i. e. both cation exchange resins and anion exchange resins, can be employed in the process of the invention, but it is necessary, in each instance, that the ion exchange resin possess an ion common with one formed by the more highly ionized solute in the solution under treatment and that it be capable of absorbing a less extensively ionized solute which is also present in the solution.

A considerable number and variety of ion exchange resins which may be employed in the process of the invention are known. Examples of suitable cation exchange resins are sulphonated phenol-formaldehyde resins, sulphonated copolymers of monovinyl aromatic hydrocarbons and polyvinyl aromatic hydrocarbons such as are disclosed in U. S. Patent No. 2,366,007, and carboxylated resins such as are disclosed in U. S. Patent No. 2,471,818, etc. The cation exchange resins may be employed either in their acidic, i. e. hydrogen-ion, or their salt form, the preferred form being dependent on the kind of ionizable solute present in a solution to be treated therewith. In most instances, a strongly ionized cation exchange resin is more effective than a weakly ionized cation exchange resin for the purpose of the invention. The cation exchange resins which are usually employed are ones ionizable to an extent such that upon adding a 10 gram portion of the acidic form of such resin to 100 cc. of a 0.1-normal aqueous sodium chloride solution, a mixture having a pH value of 3 or less is produced, and cation exchange resins containing sulphonate radicals are preferred. Peculiarly, natural zeolite, although highly ionized, has not been found satisfactory for the purpose of the invention, apparently because the interstices thereof are too small to permit the absorption of most non-ionic solutes. The aforementioned synthetic cation exchange resins permit ready and rapid absorption of a variety of non-ionic, or slightly ionized, compounds.

Examples of anion exchange resins which may be employed in the process of the invention are the resinous condensation products of phenol, formaldehyde, and alkylene polyamines which are disclosed in U. S. Patent No. 2,341,907; the resinous condensation products of phenol, alkylene polyamines and ammonia or an ammonium salt which are disclosed in U. S. Patent No. 2,546,938; and water-insoluble resinous quaternary ammonium bases and salts thereof; etc. The ion exchange resins must, of course, be substantially insoluble in the liquid medium in which they are employed; i. e. they are insoluble in water and in aqueous solutions of acids, bases, or salts. In most instances, a strongly ionized anion exchange resin (e. g. one which when added as a 10 gram portion of the basic form thereof to 100 cc. of a 0.1-normal aqueous sodium chloride solution forms a mixture having a pH value of 11 or higher) is more effective than a less highly ionized anion exchange agent for the purpose of the invention, and anion exchange resins containing quaternary ammonium radicals are preferred.

As hereinbefore mentioned, it is necessary that the ion exchange resin be capable of absorbing a non-ionized, or only slightly ionized, solute in the solution under treatment and, conversely stated, it is necessary that such solute be capable of being absorbed by the resin. The ion exchange resins appear to be readily absorptive to most non-ionized, or only slightly ionized, compounds which are of molecular sizes small enough to enter the interstices of the resins, but they do not readily, rapidly, or effectively, absorb compounds of larger molecular sizes. In most, if not all instances, the aforementioned ion exchange resins readily absorb compounds of quite small molecular sizes, such as ethyl alcohol, butyl alcohol, ethylene glycol, glycerine, acetone, formic acid, acetic acid, propionic acid, or glycine, etc., from aqueous solutions thereof, but few, if any, of the ion exchange resins absorb sucrose from an aqueous sucrose solution, apparently because the sucrose molecules are too large to enter the interstices of the resins, or enter and leave such interstices at a rate too slow to be of practical significance. In any instance, the suitability of an ion exchange resin for use in effecting a particular separation of an ionized solute from a less ionized solute present in a solution thereof may readily be determined by immersing a portion of the resin in a solution of the less ionized solute alone. If on withdrawing the granular resin, draining it free of adhering liquid, and washing it with water, the washings are found to contain a considerable amount of said solute (i. e. an amount greater than would be adsorbed on outer surfaces of impermeable granules, e. g. of glass, of a similar mesh size), the resin is satisfactorily absorptive of said solute and may be used in effecting the desired separation.

The effectiveness of an ion exchange agent in selectively absorbing the less ionized solute from a solution of the same and a more highly ionized solute is also dependent in part upon the extent of ionization of the more highly ionized solute and upon the difference in degree of ionization of the solutes. In general, the extent of separation which may be obtained becomes greater with increase in the degree of ionization of the more highly ionized solute and also with increase in the difference between the degrees of ionization of the solutes which are to be separated. In some instances, e. g. when both of the solutes in a solution are acids, the more highly ionized solute suppresses ionization of the other solute and renders the latter nearly, if not entirely, non-ionized and therefore readily absorbed by an ion exchange resin. Thus an organic carboxylic acid, such as dichloroacetic acid, may be the more highly ionized solute present in one solution capable of treatment in accordance with the invention, but may be the less highly ionized solute in another such solution, e. g. an aqueous solution of hydrochloric acid and dischloroacetic acid. For this reason, the lower limit to the range of satisfactory ionization values for the more highly ionized of the two or more solutes in solutions which may be treated in accordance with the invention overlaps somewhat on the upper limit to the range of permissible ionization values for the less extensively ionized of such solutes, and said limits should be accompanied by a statement as to the difference between the degree of ionization of the more highly ionized solute and that of the less extensively ionized solute. In general, the more highly ionized of the solutes in the solutions which may be treated in accordance with the invention are ones having ionization constants, K, at least as high as $5 \times 10^{-2}$ and preferably greater than $2 \times 10^{-1}$. The less extensively ionized solutes in such solution, i. e. the solutes which are to be absorbed selectively by the ion exchange resins, have ionization constants not greater than $2 \times 10^{-1}$ and preferably of less than $5 \times 10^{-2}$. When each of such solutes (of the kinds present in a given solution) is individually dissolved in water to form a 0.25-normal solution thereof and its degree of ionization in such solution is determined at 25° C., a given volume of the solution of the less highly ionized solute should contain not more than 70, and preferably not more than 40, per cent of the number of ions which are present in an equal volume of the solution of the more highly ionized solute. In other words, the difference between the degrees of ionization of the two solutes, when they are individually tested as just described, should be at least 30 per cent, and is preferably at least 60 per cent, of the degree of ionization of the more highly ionized solute. In a solution containing both of such solutes, the relative degree of ionization of the solutes may be different than just stated, e. g. the more highly ionized solute may suppress ionization of the other solute so that the difference between their degrees of ionization will be greater than that determined by testing them individually.

The solutions to be treated in accordance with the invention usually contain a highly ionized solute, or a mixture of highly ionized solutes, in a not greater than 7-normal, and preferably less than 2-normal, concentration. The degree of separation accomplished in practice of the invention frequently becomes greater with decrease in concentration of the more highly ionized solute in the solution used as a starting material. A change in the concentration of the less extensively ionized, or non-ionized, solute in such a solution usually has little, if any, effect on the degree of separation obtained, i. e. the starting solution may contain the less ionized solute in any desired concentration.

The process of the invention may be carried out at temperatures between that at which the solution under treatment congeals, i. e. becomes frozen or at least partially crystallized, and the boiling temperature of the solution. In most instances, the extent of separation obtained by the process becomes greater as the temperature of the solution under treatment is raised. However, a rise in temperature increases the tendency for occurrence of undesired eddy currents and may necessitate more careful control, e. g. of liquid flow rates, in carrying out the process. For convenience, the process is usually carried out at room temperature, or thereabout.

In practice of the invention, a bed of a granular ion exchange resin is flooded with water. Then, an aqueous solution of the solutes which are to be separated from one another, the more highly ionized of which solutes has an ion of a kind possessed by the resin, is fed slowly to the bed so as to displace an equal volume of water therefrom. The resultant flow of liquid through the bed may be in any direction, but is preferably either upward or downward. This flow should be quite slow so as to avoid, as far as possible, co-mingling of the solution with the water which is being flushed from the bed. The volume of solution fed to the bed is preferably, but not necessarily, less than the volume of water absorbed in the resin of the bed. Upon contact with the solution, the resin rapidly absorbs the less ionized solute, leaving most, or all, of the highly ionized solute in the surrounding liquid. The latter is then flushed from the bed by an inflow of fresh water. The flow of water is continued to extract and wash the absorbed material, i. e. the less ionized solute, from the bed of resin. The total amount of wash water thus fed to the bed preferably exceeds somewhat the volume of the solution previously fed to the bed. However, such is not necessarily the case. It is merely necessary that the volume of the wash water be as large, or larger, than the volume of water initially absorbed in the resin, i. e. the volume of wash water may be less than the volume of solution previously fed to the bed, particularly in instances in which said volume of the solution exceeds the volume of water initially absorbed in the resin.

During passage of the aqueous liquids, i. e. the starting solution and subsequently water, through the bed of ion exchange resin, there are collected, as successive fractions of the effluent liquid: (a) water flushed from the bed of ion exchange resin, (b) a fraction rich in the more highly ionized solute, but impoverished with respect to the less ionized solute; (c) usually, but not always, an intermediate aqueous fraction containing little if any of either solute; (d) a fraction rich in the less ionized solute; and (e) water, relatively free of either solute. The bed of resin is then in condition for reemployment in treating a further amount of the starting solution.

It will be understood that the above fractions (a) and (e) may be identical, i. e. they may amount to one and the same fraction. It may be mentioned that after feeding the starting solution to a bed of ion exchange resin, and thereafter feeding water to the bed to flush the solutes therefrom, the feed of the starting solution may be resumed before collection of the above-mentioned effluent fractions is completed. In other words the amount of feed water need not be sufficient, of itself, to flush all of the fractions (b)–(d) from the resin bed. It is merely necessary that the volume of water be as large, or preferably larger, than the volume of water initially absorbed in the resin. When such amount of water is used, and feed of the starting solution is resumed before completing the collection of the above-mentioned fractions (b)–(d), the water serves as a cushion between the inflowing solution and the effluent liquor and forces the remainder of the fractions (b)–(d) from the bed ahead of the same. While functioning in this manner, at least a portion of the water is consumed in desorbing the less ionized solute from the resin particles.

When, in a given cycle of the above-mentioned operations, the volume of starting solution fed to the bed of ion exchange resin is equal to or less than the volume of water initially absorbed in the resin, a major amount, by weight, of the solutes in the starting solution are collected in the above fractions (b) and (d) which contain the highly ionized solute and the less extensively ionized solute, respectively. When the starting solution is fed to the bed in amount exceeding the volume of water initially absorbed in the resin, there are obtained fractions (b) and (d) which are at least as large in volume and are quite similar in composition to the respective fractions (b) and (d) that are obtained when using a lesser amount of the starting solution. However, the aforementioned fraction (c) usually then is of a composition corresponding approximately to that of the starting solution, i. e. fraction (c) then usually consists substantially of the portion of the starting solution feed material which exceeded the volume of water initially absorbed in the resin. In such instance, the fraction (c) may be recycled to recover the solute therefrom. Accordingly, in a given cycle of operations of the process, the starting solution is preferably fed to the resin bed in amount not exceeding the volume of water initially absorbed in the resin, but it may conveniently and satisfactorily be fed in larger amount to the bed.

The accompanying drawing illustrates graphically the changes in composition of successive fractions of the effluent liquor collected during a single cycle of operations in each of several experiments which were carried out. The drawing will be referred to in greater detail in examples, hereinafter presented, as to such experiments.

The above-described cycle of operations may be repeated many times, using the same bed of resin and successive portions of a starting solution, to separate further amounts of the highly ionized solute and the less extensively ionized solute contained in the solution.

Two or more beds of an ion exchange resin may be advantageously employed in the process, with feed of a starting solution to one bed while flushing treated liquor and absorbed material from the other bed. By thus employing the beds in parallel with one another, and employing them alternately for the treatment of a starting solution, the process may be carried out in a continuous manner.

The method, as just described, may be applied in treating any of a wide variety of aqueous solutions, each containing a highly ionized solute and a less extensively ionized, or a non-ionized, solute, to separate the solutes from one another. Below are listed a number of such solutions together with ion exchange resins suitable for use in treating the same. Each solution is identified by naming the solutes contained therein.

| Solution No. | Solutes | | Ion Exchange Resin |
| --- | --- | --- | --- |
| | Ionized | Less Ionized | |
| 1 | NaCl | formaldehyde | Na salt of a sulphonated phenol-formaldehyde resin. |
| 2 | HCl | $CH_3OH$ | H-form of a sulphonated styrene-divinylbenzene copolymer. |
| 3 | $H_2SO_4$ | ethylene glycol | Do. |
| 4 | Na-acetate | $CH_3CO_2H$ | Na salt of a sulphonated styrene-divinylbenzene copolymer. |
| 5 | $NH_4Cl$ | glycine | $NH_4$ salt of a sulphonated phenol-formaldehyde resin. |
| 6 | NaOH | acetone | An insoluble resinous quaternary ammonium hydroxide. |

The following examples describe certain ways in which the invention has been practiced, but are not to be construed as limiting its scope.

EXAMPLE 1

A glass tube of approximately one inch internal diameter was filled to a depth of 27 inches with granules of the ammonium salt of a nuclear sulphonated copolymer of approximately 80 per cent by weight styrene, 8 per cent ethylvinylbenzene, and 12 per cent divinylbenzene. The granules were of from 50 to 100 mesh size according to the Tyler screen scale. The tube was held in a vertical position and was filled with water so that the granules were immersed therein. A total of 50 cc. of an aqueous solution containing approximately 2.66 grams (0.0355 mole) of glycine and 1.82 grams (0.034 mole) of ammonium chloride was fed to the tube at a rate of 4 cc. per minute, thereby displacing an equal volume of water from the tube. Water was then fed to the tube at the same rate. The liquid which was displaced from the tube by the feed of the two liquids, i. e. the starting solution and subsequently water, was collected in 25 cc. portions and each portion was analyzed for glycine and ammonium chloride. The first 125 cc. portion of the effluent liquid was nearly pure water. Starting with the sixth 25 cc. fraction of the effluent liquid, the fractions contained ammonium chloride and glycine in the concentrations (expressed as gram moles of ammonium chloride or glycine per liter) given in the following table.

Table I

| Fraction No. | Solutes in effluent liquor | |
| --- | --- | --- |
| | $NH_4Cl$ gm. moles/liter | Glycine gm. moles/liter |
| 6 | 0.335 | nil |
| 7 | 0.761 | nil |
| 8 | 0.437 | 0.08 |
| 9 | 0.039 | 0.48 |
| 10 | 0.013 | 0.54 |
| 11 | 0.006 | 0.30 |
| 12 | 0.003 | 0.12 |
| 13 | 0.002 | 0.03 |

Figure 1:
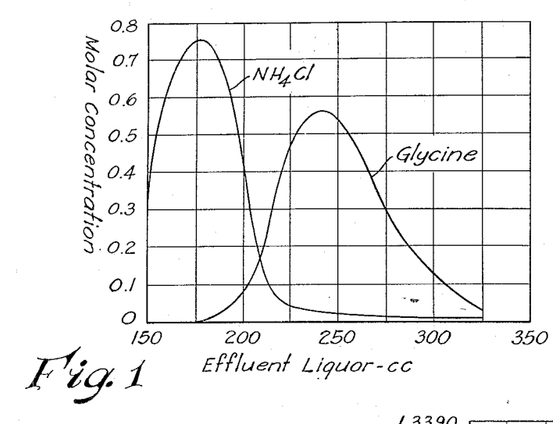

The above fractions 6–8 contained approximately 96.4 per cent of the weight of the ammonium chloride in the starting solution and fractions 9–13 contained approximately 94.7 per cent of the weight of glycine in the starting solution. The glycine in the combined fractions 9–13 was of greater than 97 per cent purity, i. e. the proportion of ammonium chloride in fractions 9–13 corresponded to less than 3 per cent of the combined weight of the ammonium chloride and glycine present. Fig. 1 of the drawing is a graph showing the changes in the molar concentrations of ammonium chloride and glycine in the above-mentioned fractions of effluent liquor.

EXAMPLE 2

This example describes two experiments which illustrate the importance of limiting the proportion of starting solution fed to a bed of ion exchange resin in a given cycle of operation. In the first experiment, an aqueous solution of glycine and ammonium chloride, which solution contained 0.71 gram mole of glycine and 0.68 gram mole of ammonium chloride per liter, was passed into a bed of a cation exchange resin, similar to that employed in Example 1, until the volume of solution fed to the bed exceeded the volume of water absorbed in the resin making up the bed. Water was then fed to the bed to flush the liquor and absorbed material therefrom. The effluent liquor was collected as successive fractions and each fraction was analyzed to determine the concentrations of glycine and ammonium chloride therein. The first 100 cc. of effluent liquor was water containing only a trace, if any, of either of the solutes. Table II identifies each of the further fractions as being stated portions, expressed in cubic centimeters, of the effluent liquor. The table also gives the concentration of each solute, in gram molecular equivalents per liter, in each fraction of the effluent liquor.

Table II

| Fraction cc. of Effluent Liquor | Solutes | |
| --- | --- | --- |
| | $NH_4Cl$ gm. moles/liter | Glycine gm. moles/liter |
| 0–100 | nil | nil |
| 100–150 | 0.122 | nil |
| 150–200 | 0.500 | 0.085 |
| 200–250 | 0.625 | 0.255 |
| 250–350 | 0.660 | 0.598 |
| 350–450 | 0.675 | 0.688 |
| 450–550 | 0.678 | 0.690 |
| 550–650 | 0.679 | 0.710 |
| 650–750 | 0.580 | 0.700 |
| 750–800 | 0.090 | 0.620 |
| 800–850 | 0.022 | 0.420 |
| 850–900 | nil | 0.180 |
| 900–1000 | nil | 0.015 |

Figure 2:
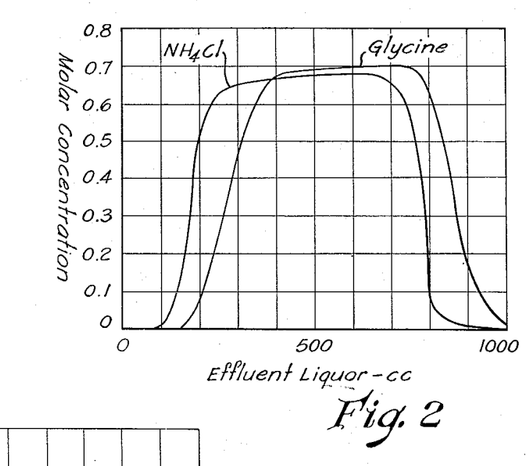

It will be noted that the 100–250 cc. fractions of the effluent liquor were far more rich in ammonium chloride than in glycine; that the 750–1000 cc. fractions were richer in glycine than in ammonium chloride; and that the intervening 250–750 cc. fractions contained both of the solutes in relative proportions corresponding fairly closely to those in the starting solution. Fig. 2 of the drawing is a graph based on the above data.

In the other experiment, a glass tube of ½ inch internal diameter was filled to a depth of approximately two feet with a granular ion exchange resin which was a sulphonated copolymer of approximately 93 per cent styrene, 3 per cent ar-ethylvinylbenzene and 4 per cent divinylbenzene. The tube was filled with water, after which 15 cc. of a solution, identical with that employed in the first experiment, was fed to the tube with resultant displacement, from the tube, of an equal volume of water. It may be mentioned that the volume of water initially absorbed in the ion exchange resin was about 39 cc., i. e. the volume of solution fed to the bed of resin was less than the volume of water absorbed in the resin. After feeding the 15 cc. of solution to the bed of resin, water was slowly introduced to flush the liquor and absorbed material from the bed. The effluent liquid was collected in successive fractions and each fraction was tested to determine its index of refraction. It may be mentioned that the index of refraction constitutes an indirect, but easily determined, measure of the concentration of solutes in the respective fractions and, since the fraction of the effluent liquor rich in the ionized solute precedes that rich in the less ionized solute, the solute present in greatest amount in a given fraction can be known by comparison with the other fractions. Table III identifies the fractions as being stated portions of the effluent liquor and gives the index of refraction of each.

*Table III*

| Fraction—cc. of Effluent Liquor | $n_D^{35}$ |
| --- | --- |
| 0–20 | 1.3311 |
| 20–22 | 1.3312 |
| 22–24 | 1.3319 |
| 24–26 | 1.3326 |
| 26–28 | 1.3335 |
| 28–30 | 1.3342 |
| 30–32 | 1.3349 |
| 32–34 | 1.3358 |
| 34–36 | 1.3370 |
| 36–37 | 1.3312 |
| 37–38 | 1.3312 |
| 38–40 | 1.3313 |
| 40–42 | 1.3327 |
| 42–44 | 1.3340 |
| 44–46 | 1.3358 |
| 46–48 | 1.3370 |
| 48–50 | 1.3367 |
| 50–52 | 1.3345 |
| 52–54 | 1.3332 |
| 54–56 | 1.3320 |
| 56–58 | 1.3317 |
| 58–60 | 1.3311 |

Figure 3:
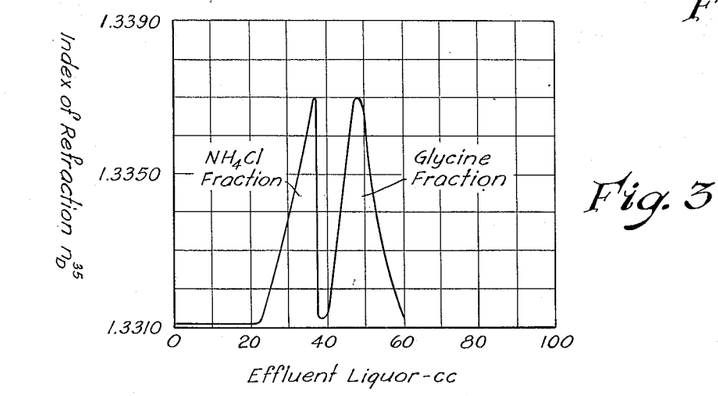

Fig. 3 of the drawing is a graph based on the data in Table III. From the two experiments just described, it will be seen that the process operates most effectively when the volume of the starting solution fed, in a given cycle of operation, to a bed of an ion exchange resin does not exceed, and preferably is less than, the volume of water absorbed by the resin.

EXAMPLE 3

Two experiments were carried out on treating an aqueous solution of sodium chloride and ethylene glycol to separate these solutes from one another. The procedure and the kind and quantity of ion exchange resin were similar to those of the second of the experiments described in Example 2. The starting solution contained each of the solutes, sodium chloride and ethylene glycol, in a 0.67 normal concentration. The bed of resin was initially covered with water. A 15 cc. portion of the starting solution was fed to the bed, thereby displacing an equal volume of water, after which water was fed to the bed. The effluent liquid which was displaced by feed of the solution and subsequently of water to the bed, was collected as successive fractions. Each fraction was tested to determine its index of refraction. In one of the experiments the rate of feed of the starting solution, and thereafter of water, to the resin bed was 1.3 cc. per minute, whereas said rate of feed was 0.5 cc. per minute in the other experiment. Table IV identifies each experiment by giving the feed rate which was employed. It indicates the portion in cubic centimeters, of effluent liquor which was collected as each fraction and gives the index of refraction of each fraction.

*Table IV*

| Experiment Using Feed Rate of 1.3 cc./min. | | Experiment Using Feed Rate of 0.5 cc./min. | |
| --- | --- | --- | --- |
| Fraction—cc. of Effluent Liquor | $n_D^{35}$ | Fraction—cc. of Effluent Liquor | $n_D^{35}$ |
| 0–16 | 1.3312 | 0–16 | 1.3311 |
| 16–18 | 1.3318 | 16–18 | 1.3314 |
| 18–20 | 1.3318 | 18–20 | 1.3317 |
| 20–22 | 1.3320 | 20–22 | 1.3321 |
| 22–24 | 1.3330 | 22–24 | 1.3330 |
| 24–26 | 1.3343 | 24–26 | 1.3339 |
| 26–28 | 1.3353 | 26–28 | 1.3347 |
| 28–30 | 1.3363 | 28–30 | 1.3355 |
| 30–32 | 1.3367 | 30–32 | 1.3363 |
| 32–34 | 1.3332 | 32–34 | 1.3371 |
| 34–35 | 1.3326 | 34–36 | 1.3372 |
| 35–36 | 1.3323 | 36–37 | 1.3315 |
| 36–38 | 1.3334 | 37–38 | 1.3320 |
| 38–40 | 1.3341 | 38–39 | 1.3329 |
| 40–42 | 1.3339 | 39–40 | 1.3340 |
| 42–44 | 1.3331 | 40–42 | 1.3357 |
| 44–46 | 1.3323 | 42–44.5 | 1.3350 |
| 46–48 | 1.3318 | 44.5–47 | 1.3322 |
| 48–50 | 1.3312 | 47–49.5 | 1.3311 |

Figure 4:
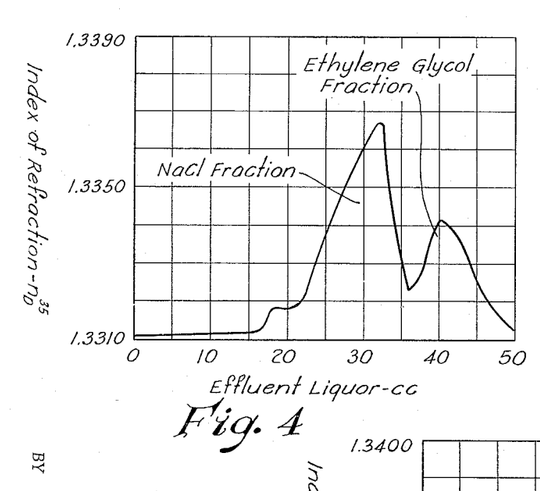
Figure 5:
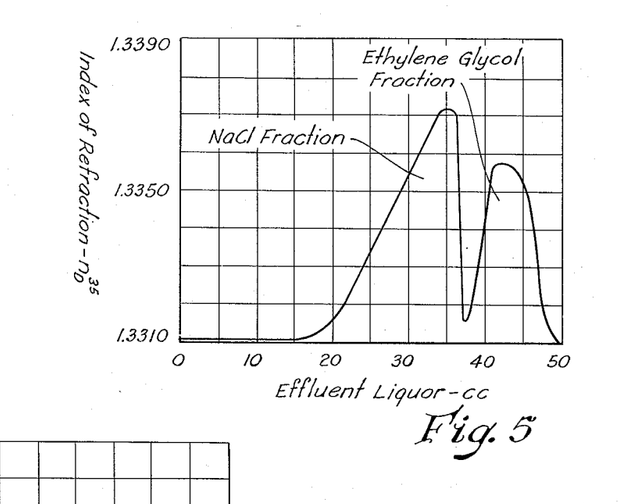

Figs. 4 and 5 of the drawing are graphs based on the above data concerning the respective experiments. As will be seen from the data, a decrease in feed rate, particularly of water for displacing the solutes from a bed of ion resin, results in an increase in concentration of the solutes in their respective fractions of the effluent liquor and, usually, in more nearly complete separation of the solutes from one another.

EXAMPLE 4

In each of a series of experiments, 15 cc. of an aqueous solution of a highly ionized solute and a less extensively ionized solute was passed into a bed of a granular cation exchange resin at a feed rate of approximately one cubic centimeter per minute, after which water was fed to the bed at the same rate for purpose of displacing the solutes from the bed. The resultant effluent liquor was collected as a series of fractions. Each fraction was tested to determine its index of refraction. The ion exchange resin which was employed in each of the experiments was a nuclear sulphonated copolymer of about 93 per cent by weight styrene, 3 per cent ethylvinylbenzene, and 4 per cent divinylbenzene. It was contained in a vertical tube of ½ inch internal diameter as a bed having a depth of about 2 feet. The experiments differed from one another in that the starting solution employed in one experiment was an aqueous solution of sodium chloride and formaldehyde, each in a 0.67 normal concentration; that employed in another experiment was an aqueous solution of acetic acid in a 0.67 normal concentration and hydrochloric acid in a 1.09 normal concentration; and that employed in a third experiment was an aqueous solution of acetic acid in a 0.67 normal concentration and trichloroacetic acid in a 0.24 normal concentration. In the first of these experiments the ion exchange resin was employed in the form of a sodium salt thereof. In the other experiments, it was employed in its acidic form, i. e. its H-form. Table V identifies each of the starting solutions by naming the solutes contained therein. The table identifies each of the fractions of effluent liquor in terms of the portion, expressed in cubic centimeters, of such liquor and gives the index of refraction of each fraction.

EXAMPLE 5

This experiment illustrates the use of an anion exchange resin in the process of the invention. The resin which was employed was a copolymer of a mixture of about 87 per cent by weight styrene, 5 per cent ethylvinylbenzene, and 8 per cent divinylbenzene, which copolymer contained:

radicals as substituents on the aromatic nuclei thereof. A vertical tube of ½ inch internal diameter was charged to a depth of about 2 feet with the granular resin and the tube was filled with water. A 15 cc. portion of an aqueous solution of hydrochloric acid in a 1.09 normal concentration and acetic acid in a 0.67 normal concentration was fed to the tube at a rate of approximately one cubic centimeter per minute, thereby displacing an equal volume of water from the tube. Water was then fed at the same rate of the tube. The effluent liquid, resulting from feed of the two liquids to the bed, was collected as successive fractions. The index of refraction, $n_D^{25}$, was determined for each fraction. Table VI identifies each fraction by stating the cubic centimeters of the effluent liquor which it represents, and gives the index of refraction of the fraction.

*Table V*

| Experiment Using Solution of NaCl and Formaldehyde | | Experiment Using Solution of HCl and Acetic Acid | | Experiment Using Solution of Trichloroacetic Acid and Acetic Acid | |
|---|---|---|---|---|---|
| Fraction of Effluent Liquor, cc. | $n_D^{25}$ | Fraction of Effluent Liquor, cc. | $n_D^{25}$ | Fraction of Effluent Liquor, cc. | $n_D^{25}$ |
| 0–14 | 1.3321 | 0–10 | 1.3321 | 0–10 | 1.3321 |
| 14–16 | 1.3322 | 10–18 | 1.3321 | 10–18 | 1.3322 |
| 16–18 | 1.3324 | 18–22 | 1.3328 | 18–20 | 1.3325 |
| 18–20 | 1.3328 | 22–24 | 1.3333 | 20–22 | 1.3330 |
| 20–22 | 1.3333 | 24–26 | 1.3340 | 22–24 | 1.3333 |
| 22–24 | 1.3340 | 26–28 | 1.3350 | 24–26 | 1.3340 |
| 24–26 | 1.3348 | 28–30 | 1.3361 | 26–28 | 1.3346 |
| 26–28 | 1.3358 | 30–32 | 1.3374 | 28–30 | 1.3351 |
| 28–30 | 1.3372 | 32–34 | 1.3390 | 30–32 | 1.3356 |
| 30–32 | 1.3382 | 34–36 | 1.3407 | 32–34 | 1.3361 |
| 32–33.5 | 1.3384 | 36–38 | 1.3399 | 34–35 | 1.3360 |
| 33.5–34 | 1.3345 | 38–40 | 1.3321 | 35–36 | 1.3336 |
| 34–36 | 1.3321 | 40–42 | 1.3321 | 36–37 | 1.3321 |
| 36–38 | 1.3324 | 42–44 | 1.3323 | 37–38 | 1.3321 |
| 38–40 | 1.3330 | 44–46 | 1.3335 | 38–40 | 1.3321 |
| 40–42 | 1.3340 | 46–48 | 1.3349 | 40–42 | 1.3328 |
| 42–44 | 1.3341 | 48–50 | 1.3351 | 42–44 | 1.3338 |
| 44–46 | 1.3339 | 50–52 | 1.3345 | 44–46 | 1.3346 |
| 46–48 | 1.3330 | 52–54 | 1.3335 | 46–48 | 1.3347 |
| 48–50 | 1.3322 | 54–56 | 1.3328 | 48–50 | 1.3343 |
| 50–52 | 1.3321 | 56–58 | 1.3322 | 50–52 | 1.3340 |
| | | 58–60 | 1.3321 | 52–54 | 1.3332 |
| | | | | 54–56 | 1.3321 |
| | | | | 56–58 | 1.3321 |

*Table VI*

| Fraction | | |
|---|---|---|
| No. | cc. of Effluent Liquor in Fraction | $n_D^{25}$ |
| 1 | 0–26 | 1.3321 |
| 2 | 26–28 | 1.3335 |
| 3 | 28–30 | 1.3342 |
| 4 | 30–32 | 1.3351 |
| 5 | 32–34 | 1.3361 |
| 6 | 34–36 | 1.3370 |
| 7 | 36–38 | 1.3386 |
| 8 | 38–40 | 1.3399 |
| 9 | 40–42 | 1.3394 |
| 10 | 42–44 | 1.3336 |
| 11 | 44–46 | 1.3323 |
| 12 | 46–48 | 1.3327 |
| 13 | 48–50 | 1.3330 |
| 14 | 50–52 | 1.3337 |
| 15 | 52–54 | 1.3340 |
| 16 | 54–56 | 1.3340 |
| 17 | 56–58 | 1.3338 |
| 18 | 58–60 | 1.3331 |
| 19 | 60–62 | 1.3327 |
| 20 | 62–64 | 1.3321 |

Figure 9:
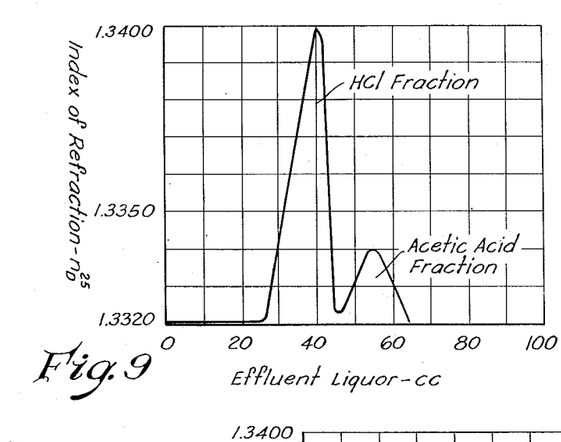

The first of the above fractions was nearly pure water. Fractions 2–10 were rich in hydrochloric acid. Fraction 11 contained very little of either solute, i. e. it was principally water. Fractions 12–19 were rich in acetic acid. Fraction 20 was nearly pure water. Fig. 9 of the drawing is a graph based on the data in Table VI.

EXAMPLE 6

Figure 6:
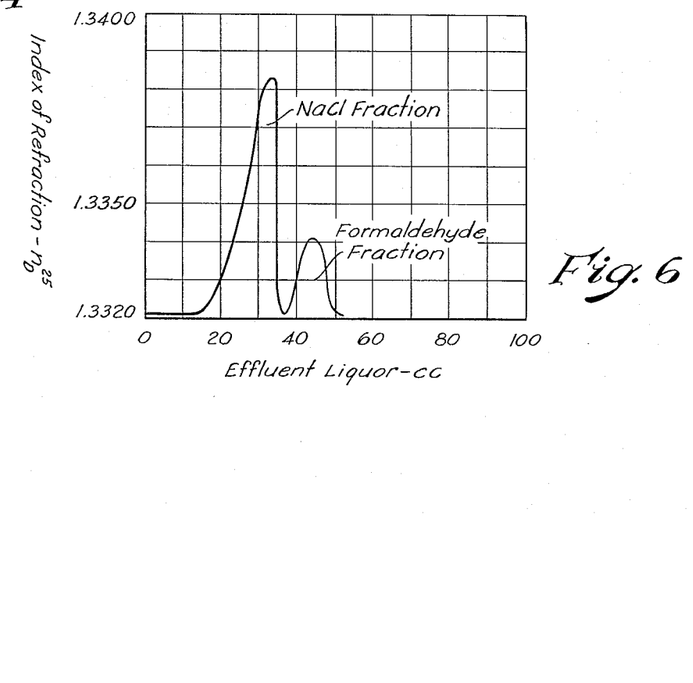
Figure 7:
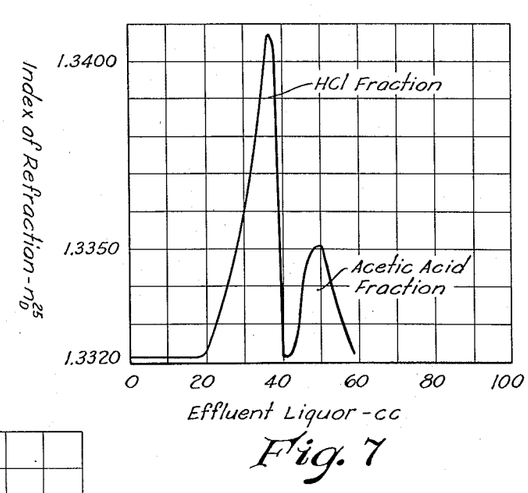
Figure 8:
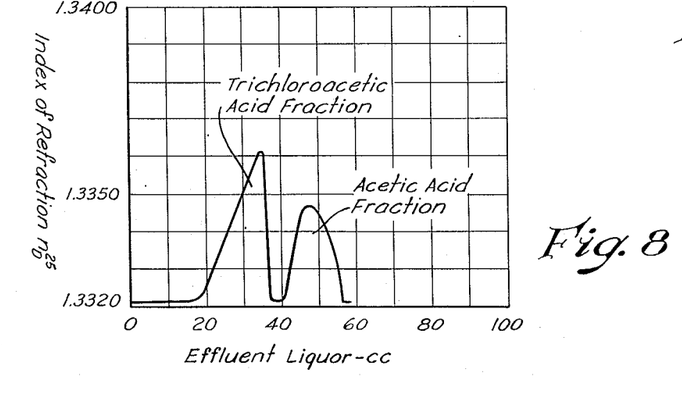

A vertical tube of ½ inch internal diameter was filled to a depth of about 2 feet with a granu- Figs. 6–8 of the drawing are graphs based on the data concerning the respective experiments just described.

lar anion exchange resin of from 50 to 100 mesh particle size according to the Tyler screen scale. The resin was one which had been prepared by reacting a nuclear chloromethylated copolymer of about 93 per cent by weight styrene, 3 per cent ar-ethylvinylbenzene, and 4 per cent divinylbenzene with diethylene triamine. It was employed in the form of its hydrochloride salt. The tube, having the bed of resin therein, was filled with water. A 15 cc. portion of an aqueous solution of sodium chloride and ethyl alcohol, each in a 2 per cent by weight concentration, was fed to the tube at a rate of about one cubic centimeter per minute, thereby displacing an equal amount of water from the tube. Water was then fed to the tube at a rate of about one cubic centimeter per minute. The displaced effluent liquor was collected in fractions. Each fraction was tested to determine its index of refraction. Table VII identifies each fraction of the effluent liquor in the same way as in the preceding examples and gives its index of refraction.

*Table VII*

| Fraction No. | cc. of Effluent Liquor in Fraction | $n_D^{35}$ |
|---|---|---|
| 1 | 0–44 | 1.3310 |
| 2 | 44–46 | 1.3319 |
| 3 | 46–48 | 1.3329 |
| 4 | 48–50 | 1.3339 |
| 5 | 50–52 | 1.3340 |
| 6 | 52–54 | 1.3340 |
| 7 | 54–56 | 1.3340 |
| 8 | 56–58 | 1.3340 |
| 9 | 58–60 | 1.3330 |
| 10 | 60–62 | 1.3316 |
| 11 | 62–64 | 1.3310 |
| 12 | 64–66 | 1.3310 |
| 13 | 66–68 | 1.3310 |
| 14 | 68–70 | 1.3313 |
| 15 | 70–72 | 1.3318 |
| 16 | 72–74 | 1.3319 |
| 17 | 74–76 | 1.3320 |
| 18 | 76–78 | 1.3319 |
| 19 | 78–80 | 1.3315 |
| 20 | 80–82 | 1.3311 |
| 21 | 82–84 | 1.3310 |

EXAMPLE 7

A vertical tube of ½ inch internal diameter was filled to a depth of about 2 feet with a granular resin of from 50 to 100 mesh particle size, as determined with Tyler screens, which resin is insoluble in water and aqueous solutions of acids or alkalies and contains carboxylate radicals as the ion exchanging radicals of the same. The carboxylated resin was in the form of its sodium salt. The tube, having the bed of resin therein, was filled with water. A 15 cubic centimeter portion of an aqueous solution, containing approximately 2 per cent by weight of sodium chloride and 2 per cent of formaldehyde, was fed to the tube at a rate of approximately one cubic centimeter per minute. Expressed in another way, said solution contained approximately 0.34 gram mole of sodium chloride and approximately 1.33 gram moles of formaldehyde per liter. After introducing the 15 cc. portion of the solution, water was fed to the tube at a rate of about one cubic centimeter per minute, thereby displacing an equal amount of liquor from the tube. The effluent liquor was collected in fractions and the index of refraction of each fraction was determined. Table VIII identifies each such fraction, as in the preceding examples, and gives its index of refraction.

*Table VIII*

| Fraction No. | cc. of Effluent Liquor in Fraction | $n_D^{35}$ |
|---|---|---|
| 1 | 0–52 | 1.3310 |
| 2 | 52–54 | 1.3311 |
| 3 | 54–56 | 1.3313 |
| 4 | 56–58 | 1.3317 |
| 5 | 58–60 | 1.3326 |
| 6 | 60–62 | 1.3336 |
| 7 | 62–64 | 1.3341 |
| 8 | 64–66 | 1.3343 |
| 9 | 66–68 | 1.3344 |
| 10 | 68–70 | 1.3345 |
| 11 | 70–72 | 1.3343 |
| 12 | 72–74 | 1.3322 |
| 13 | 74–76 | 1.3314 |
| 14 | 76–78 | 1.3316 |
| 15 | 78–80 | 1.3317 |
| 16 | 80–82 | 1.3324 |
| 17 | 82–84 | 1.3327 |
| 18 | 84–86 | 1.3327 |
| 19 | 86–88 | 1.3325 |
| 20 | 88–90 | 1.3317 |
| 21 | 90–92 | 1.3313 |
| 22 | 92–94 | 1.3311 |
| 23 | 94–96 | 1.3310 |
| 24 | 96–98 | 1.3310 |
| 25 | 98–100 | 1.3310 |
| 26 | 100–102 | 1.3310 |

EXAMPLE 8

This example describes a number of separations which were carried out using, as the ion exchange resin, the sodium salt of a nuclear sulphonated copolymer of styrene, ethylvinylbenzene, and divinylbenzene similar to that described in Example 1. In each experiment, a vertical tube of ½ inch internal diameter was charged to a depth of about 2 feet with the granular resin and the tube was filled with water. A 15 cc. portion of a solution to be treated was fed to the tube at a rate of approximately one cubic centimeter per minute, thereby displacing an equal volume of water from the tube. Water was then fed at the same rate to the tube. The displaced effluent liquor was collected as a series of fractions. The index of refraction of each fraction was determined. Table IX gives the data collected in these experiments. For convenience, the experiments are referred to as "a"–"f" in the table. The aqueous solutions which were treated in these respective experiments were as follows:

*Table*

| Experiment | Solutes Present | |
|---|---|---|
| | Kind | Concentration gm. moles/liter |
| a | NaCl | 0.68 |
| | Glycerine | 0.43 |
| b | NaCl | 0.68 |
| | Ethylene glycol | 0.65 |
| c | NaCl | 0.68 |
| | Diethylene glycol | 0.38 |
| d | NaCl | 0.68 |
| | Triethylene glycol | 0.27 |
| e | NaCl | 0.68 |
| | Tetraethylene glycol | 0.21 |
| f | NaCl | 0.68 |
| | Triethanolamine | 0.27 |

Table IX identifies each fraction collected in a given experiment by stating the cubic centimeters of the effluent liquor collected as the fraction. It gives the index of refraction of each fraction.

Table IX

| Experiment | a | | b | | c | | d | | e | | f | |
|---|---|---|---|---|---|---|---|---|---|---|---|---|
| Fractions of Effluent Liquor | cc. | $n_D^{35}$ | cc. | $n_D^{35}$ | cc. | $n_D^{35}$ | cc. | $n_D^{35}$ | cc. | $n_D^{35}$ | cc. | $n_D^{35}$ |
| 1 | 0–17 | 1.3310 | 0–20 | 1.3312 | 0–19 | 1.3311 | 0–19 | 1.3313 | 0–20 | 1.3312 | 0–16 | 1.3311 |
| 2 | 17–18 | 1.3312 | 20–22 | 1.3323 | 19–20 | 1.3314 | 19–20 | 1.3319 | 20–22 | 1.3323 | 16–18 | 1.3316 |
| 3 | 18–20 | 1.3322 | 22–24 | 1.3341 | 20–22 | 1.3326 | 20–22 | 1.3333 | 22–24 | 1.3336 | 18–20 | 1.3319 |
| 4 | 20–22 | 1.3340 | 24–26 | 1.3359 | 22–24 | 1.3346 | 22–24 | 1.3353 | 24–26 | 1.3355 | 20–22 | 1.3347 |
| 5 | 22–24 | 1.3360 | 26–28 | 1.3371 | 24–26 | 1.3363 | 24–26 | 1.3371 | 26–30 | 1.3378 | 22–24 | 1.3364 |
| 6 | 24–26 | 1.3375 | 28–30 | 1.3372 | 26–28 | 1.3371 | 26–28 | 1.3380 | 30–31 | 1.3379 | 24–26 | 1.3374 |
| 7 | 26–28 | 1.3378 | 30–32 | 1.3361 | 28–30 | 1.3375 | 28–30 | 1.3382 | 31–32 | 1.3380 | 26–28 | 1.3376 |
| 8 | 28–30 | 1.3364 | 32–33 | 1.3320 | 30–32 | 1.3353 | 30–32 | 1.3328 | 32–33 | 1.3374 | 28–30 | 1.3336 |
| 9 | 30–32 | 1.3330 | 33–34 | 1.3314 | 32–33 | 1.3318 | 32–34 | 1.3335 | 33–34 | 1.3342 | 30–32 | 1.3313 |
| 10 | 32–33 | 1.3336 | 34–36 | 1.3321 | 33–34 | 1.3349 | 34–35 | 1.3339 | 34–35 | 1.3329 | 32–33 | 1.3310 |
| 11 | 33–35 | 1.3350 | 36–38 | 1.3331 | 34–36 | 1.3330 | 36–38 | 1.3349 | 35–36 | 1.3331 | 33–34 | 1.3311 |
| 12 | 35–36 | 1.3357 | 38–40 | 1.3344 | 36–38 | 1.3340 | 36–38 | 1.3344 | 36–39 | 1.3344 | 34–36 | 1.3321 |
| 13 | 36–37 | 1.3355 | 40–42 | 1.3341 | 38–40 | 1.3342 | 40–42 | 1.3336 | 39–40 | 1.3345 | 36–38 | 1.3331 |
| 14 | 37–38 | 1.3350 | 42–44 | 1.3333 | 40–42 | 1.3340 | 42–44 | 1.3331 | 40–41 | 1.3346 | 38–40 | 1.3332 |
| 15 | 38–40 | 1.3335 | 44–46 | 1.3323 | 42–44 | 1.3332 | 44–46 | 1.3321 | 41–42 | 1.3345 | 40–42 | 1.3331 |
| 16 | 40–42 | 1.3320 | 46–48 | 1.3318 | 44–46 | 1.3321 | 46–48 | 1.3315 | 42–44 | 1.3340 | 42–44 | 1.3330 |
| 17 | 42–44 | 1.3314 | 48–49 | 1.3313 | 46–48 | 1.3319 | 48–52 | 1.3311 | 44–46 | 1.3335 | 44–46 | 1.3325 |
| 18 | 44–46 | 1.3310 | 49–50 | 1.3311 | 48–50 | 1.3315 | 52–55 | 1.3311 | 46–48 | 1.3327 | 46–48 | 1.3321 |
| 19 | | | | | 50–52 | 1.3312 | | | 48–50 | 1.3320 | 48–50 | 1.3320 |
| 20 | | | | | 52–54 | 1.3311 | | | 50–52 | 1.3318 | 50–52 | 1.3319 |
| 21 | | | | | | | | | 52–54 | 1.3315 | 52–54 | 1.3317 |
| 22 | | | | | | | | | 54–56 | 1.3312 | 54–56 | 1.3315 |
| 23 | | | | | | | | | 56–58 | 1.3311 | 56–58 | 1.3315 |
| 24 | | | | | | | | | | | 58–60 | 1.3313 |
| 25 | | | | | | | | | | | 60–62 | 1.3313 |
| 26 | | | | | | | | | | | 62–64 | 1.3312 |

In experiment (a) of Table IX, the fractions 3–8 were rich in sodium chloride and fractions 10–16 were rich in glycereine. The other fractions were impoverished with respect to both of the solutes, i. e. they were nearly pure water. Similarly, in experiment (b) the fractions 2–8 were rich in sodium chloride and fractions 10–16 were rich in ethylene glycol. In experiment (c), fractions 3–8 were rich in sodium chloride and fractions 10–17 were rich in diethylene glycol. In experiment (d), fractions 2–8 were rich in sodium chloride and fractions 9–15 were rich in triethylene glycol. In experiment (e), fractions 2–10 were rich in sodium chloride and fractions 11–20 contained tetraethylene glycol as the solute present in greatest amount. In experiment (f), fractions 3–9 contained most of the triethanolamine that had been present in the starting solution.

EXAMPLE 9

A number of aqueous solutions, each containing 0.25 gram molecular equivalent per liter of a highly ionized acid and a like concentration of a less extensively ionized acid were, in separate experiments, employed as starting materials in a process otherwise similar to that described in Example 1. The purpose was to test the effectiveness of the process in separating the individual acids present in solutions of various pairs of acids. The results obtained in the several experiments varied from instances in which a nearly complete separation of the acids was obtained to an instance in which the acids in a starting solution were not separated to an appreciable extent by the process. One of the acids used in certain of the experiments is hydrochloric acid. It is almost completely ionized in dilute aqueous solutions thereof. Table X names the acids present in each of the starting solutions and gives the ionization constant, K, of each of the acids other than the hydrochloric acid. The table also indicates the extent to which the acids present in a starting solution were separated from one another as follows: "good," meaning nearly complete separation; "fair," meaning that a major portion, but not all, of each acid was obtained in a form nearly free of the other acid; "poor," meaning that an observable degree of separation was obtained, but the separation was far from complete; and "none," meaning that the acids of the starting solution were not separated from one another to an appreciable, or practical, extent.

Table X

| Experiment No. | Acids in Starting Solution | | | | Separation of Acids |
|---|---|---|---|---|---|
| | Kind | K | Kind | K | |
| 1 | HCl | | Acetic | $1.75 \times 10^{-5}$ | Good. |
| 2 | HCl | | Chloroacetic | $1.4 \times 10^{-3}$ | Do. |
| 3 | HCl | | Dichloroacetic | $5 \times 10^{-2}$ | Do. |
| 4 | Trichloroacetic | $2 \times 10^{-1}$ | Acetic | $1.75 \times 10^{-5}$ | Fair. |
| 5 | ...do... | $2 \times 10^{-1}$ | Chloroacetic | $1.4 \times 10^{-3}$ | Do. |
| 6 | ...do... | $2 \times 10^{-1}$ | Dichloroacetic | $5 \times 10^{-2}$ | Do. |
| 7 | Dichloroacetic | $5 \times 10^{-2}$ | Acetic | $1.75 \times 10^{-5}$ | Poor. |
| 8 | ...do... | $5 \times 10^{-2}$ | Chloroacetic | $1.4 \times 10^{-3}$ | Do. |
| 9 | Chloroacetic | $1.4 \times 10^{-3}$ | Acetic | $1.75 \times 10^{-5}$ | None. |

It will be noted that the separation becomes poorer with decrease in the difference between the ionization constants of the solutes present in the starting solution, and also with decrease in the values of the ionization constants of the more highly ionized of the solutes in the starting solutions. Experiments 3, 7, and 8 of Table X show that a compound which is the less extensively ionized of the solutes in one solution, suitable for treatment in accordance with the invention may be the more highly ionized of the solutes present in other starting solutions.

I claim:

1. A method for separating from one another a highly ionized solute having an ionization constant at least as great as $5 \times 10^{-2}$ and a less extensively ionized solute that is capable of being absorbed by an ion exchange resin and that has an ionization constant not exceeding $2 \times 10^{-1}$ and not more than 70 per cent as great as that of the highly ionized solute, which method comprises feeding, to a water-immersed bed of an ion exchange resin having an ion identical with an ion of the highly ionized solute, an aqueous solution of such solutes and thus displacing water from the bed of resin, thereafter feeding water to the bed to displace a further amount of liquid from the bed, and collecting successive fractions of the displaced effluent liquid, whereby there is obtained a fraction of the effluent liquid which contains a major portion of the highly ionized solute and a subsequent fraction of the effluent liquid which contains a major portion of the less extensively ionized solute.

2. A method wherein the steps described in claim 1 are repeated using a further amount of the starting solution and the same bed of ion exchange resin.

3. A method, as described in claim 1, wherein the ion exchange resin is a cation exchange resin having an acidic form which is ionized to an extent such that the addition of a 10 gram portion thereof to 100 cubic centimeters of a 0.1 normal aqueous sodium chloride solution brings the solution to a pH value of less than 3.

4. A method, as described in claim 1, wherein the ion exchange resin is an anion exchange resin having a basic form which is ionized to an extent such that the addition of a 10 gram portion thereof to 100 cubic centimeters of a 0.1 normal aqueous sodium chloride solution brings the solution to a pH value greater than 11.

5. A method, as described in claim 1, wherein the ion exchange resin is a cation exchange resin which contains sulphonate radicals as the functional groups of the same.

6. A method, as described in claim 1, wherein the ion exchange resin is a nuclear sulphonated copolymer of a major amount of at least one polymerizable monoalkenyl aromatic hydrocarbon and a minor amount of divinylbenzene.

7. A method, as described in claim 1, wherein the ion exchange resin is a nuclear sulphonated copolymer of a major amount of styrene and minor amounts of ar-ethyl-vinylbenzene and divinylbenzene.

8. A method, as described in claim 1, wherein the ion exchange resin is an anion exchange resin which contains quaternary ammonium radicals as the functional groups thereof.

9. A method, as described in claim 1, wherein the more highly ionized solute possesses an ionization constant at least as great as $2 \times 10^{-1}$ and the less extensively ionized solute has an ionization constant of less than $5 \times 10^{-2}$.

10. A method for separating from one another a highly ionized solute having an ionization constant at least as great as $5 \times 10^{-2}$ and a less extensively ionized solute that is capable of being absorbed by an ion exchange resin and that has an ionization constant not exceeding $2 \times 10^{-1}$ and not more than 70 per cent as great as that of the highly ionized solute, which method comprises feeding, to a water-immersed bed of an ion exchange resin having an ion identical with an ion of the highly ionized solute, an aqueous solution, of such solutes, in an amount having a volume not exceeding that of water initially absorbed in the resin and thus displacing water from the bed of resin, thereafter feeding water to the bed to displace a further amount of liquid from the bed and collecting successive fractions of the displaced effluent liquid, whereby there is obtained a fraction of the effluent liquid which contains a major portion of the highly ionized solute and a subsequent fraction of the effluent liquid which contains a major portion of the less extensively ionized solute.

References Cited in the file of this patent

UNITED STATES PATENTS

| Number | Name | Date |
|---|---|---|
| 2,341,907 | Cheetham | Feb. 15, 1944 |
| 2,366,007 | D'Alelio | Dec. 26, 1944 |
| 2,471,818 | Hunter et al. | May 31, 1949 |
| 2,546,938 | Bauman et al. | Mar. 27, 1951 |

OTHER REFERENCES

Myers et al.: "Adsorption Isotherms of Synthetic Resin Ion Exchange Adsorbents," Industrial and Engineering Chemistry, vol. 33, pages 1270–1275.